United States Patent [19]

Nanbu

[11] 4,414,261
[45] Nov. 8, 1983

[54] ADHESIVE TAPE

[75] Inventor: Kazuhiko Nanbu, Nagahama, Japan

[73] Assignee: Mitsubishi Plastics Industries Limited, Tokyo, Japan

[21] Appl. No.: 417,879

[22] Filed: Sep. 14, 1982

[30] Foreign Application Priority Data

Oct. 27, 1981 [JP] Japan ................................ 56-171582

[51] Int. Cl.³ ............................. B32B 7/02; C09J 7/02
[52] U.S. Cl. .................................... 428/213; 428/214; 428/215; 428/216; 428/343; 428/353; 428/354; 428/515; 428/516; 428/520
[58] Field of Search ........ 428/343, 353, 354, 212-216, 428/515, 516, 520

[56] References Cited

U.S. PATENT DOCUMENTS 4,137,362  1/1979  Miki et al. ...................... 428/343 X
4,173,676  11/1979  Asakura et al. ................. 428/343 X
4,335,171  6/1982  Zenk .............................. 428/343 X Primary Examiner—Thomas J. Herbert, Jr.
Attorney, Agent, or Firm—Oblon, Fisher, Spivak, McClelland & Maier

[57] ABSTRACT

An adhesive tape comprises a base sheet and an adhesive layer coated on one side of the base sheet, characterized in that said base sheet comprises an intermediate layer made of a crystalline polypropylene containing from 25 to 35% by weight of a petroleum resin and outer layers made of a crystalline polypropylene laminated on both sides of the intermediate layer, said intermediate layer having a thickness within a range of from 60 to 90% of the total thickness of the base sheet and the layers of the base sheet being biaxially oriented so that the orientation in the longitudinal direction is greater than the orientation in the transverse direction.

13 Claims, No Drawings

ADHESIVE TAPE

BACKGROUND OF THE INVENTION

1. Field of the Invention

The present invention relates to a transparent polypropylene adhesive tape which is readily severable by fingers or by a cutter blade of an adhesive tape dispenser.

2. Description of the Prior Art

Transparent adhesive tapes comprising a base sheet composed mainly at a polypropylene and coated with an adhesive, have been commercially available. However, none of them completely satisfies various requirements for a transparent adhesive tape. Especially with respect to the severability of the tape which is decisive to the efficiency in the practical use of the adhesive tape, none of the conventional adhesive tapes fully satisfies the requirements for both the tearability by fingers and the severability by a dispenser cutter blade.

The present inventor has conducted an extensive research to overcome the above mentioned difficulties of the conventional adhesive tapes and to obtain a transparent polypropylene adhesive tape having good severability, and, as a result, has found that the tearability by fingers (hereinafter referred to as "finger-tearability") can be improved by incorporating a petroleum resin to a polypropylene, but by the incorporation of the petroleum resin, the tape tends to have a great elongation or stretchability and its severability by the adhesive tape dispenser cutter blade (hereinafter referred to as "dispenser severability") will be impaired.

SUMMARY OF THE INVENTION

As a result of a further research, it has been found that both the finger tearability and the dispenser severability can be improved by laminating a thin polypropylene layer on each side of the polypropylene layer incorporated with the petroleum resin. The present invention has been accomplished based on this discovery.

Namely, the present invention provides an adhesive tape which comprises a base sheet and an adhesive layer coated on one side of the base sheet, characterized in that said base sheet comprises an intermediate layer made of a crystalline polypropylene containing from 25 to 35% by weight of a petroleum resin and outer layers made of a crystalline polypropylene laminated on both sides of the intermediate layer, said intermediate layer having a thickness within a range of from 60 to 90% of the total thickness of the base sheet and the layers of the base sheet being biaxially oriented so that the orientation in the longitudinal direction is greater than the orientation in the transverse direction.

DETAILED DESCRIPTION OF THE PREFERRED EMBODIMENTS

The crystalline polypropylene in the present invention may be an isotactic polypropylene of a propylene homopolymer commonly used for films. Preferred is an isotactic polypropylene having an isotactic index of from 90 to 97% and a melt index of from 0.5 to 4.0.

The petroleum resin used for the intermediate layer may be an aliphatic petroleum resin, an alicyclic petroleum resin or an aromatic petroleum resin. However, in view of the heat resistance and the compatibility with the polypropylene, it is preferred to use a fully hydrogenated alicyclic petroleum resin.

It is essential that the content of the petroleum resin is within a range of from 25 to 35% by weight based on the total weight of the intermediate layer. As mentioned above, the petroleum resin content is influential to the finger tearability of the adhesive tape. If the content is less than 25% by weight, the finger tearabilty of the adhesive tape tends to be poor. On the other hand, if the content exceeds 35% by weight, the stretch processability tends to be inferior and the dispenser severability of the adhesive tape tends to be poor. Further, depending upon the storage condition (at a temperature of 60° C. or higher) of the tape in a wound-up state, the tape tends to undergo shrinkage and the wound-up tape configuration tends to undergo a telescopic deformation.

Further, in addition to the petroleum resin, a small amount, e.g. from 1 to 20% by weight, of an ethylene-α-olefin copolymer such as an ethylene-propylene copolymer or an ethylene-butene-1 copolymer may be incorporated in the intermediate layer to improve the inter layer adhesion to the crystalline polypropylene layers as the outer layers.

In the preparation of the adhesive tape of the present invention, firstly the crystalline polypropylene layers are laminated on both sides of the intermediate layer made of the crystalline polypropylene containing the petroleum resin to form the base sheet. The lamination may be carried out by a usual method such as an extrusion lamination method or a co-extrusion lamination method. With respect to the ratio in the thickness of the layers of the base sheet, it is necessary that the thickness of the intermediate layer is within a range of from 60 to 90% of the total thickness of the base sheet. Namely, if the thickness of the intermediate layer is less than 60%, the finger tearability of the adhesive tape thereby obtained becomes extremely poor. On the other hand, if the thickness exceeds 90%, the elongation or stretchability of the adhesive tape increases thus leading to inferior dispenser severability. The ratio of the thickness of the crystalline polypropylene layer laminated on one side of the intermediate layer to the thickness of the crystalline polypropylene layer laminated on the other side of the intermediate layer, is preferably from 1.5:1 to 1:1.5. By setting the thickness of both layers to be substantially equal in this manner, it is possible to prevent the curling of the final adhesive tape.

Then, an adhesive layer is applied to one side of the base sheet having the above construction. When an acrylic acid ester adhesive is used as the adhesive, it is preferred for an improvement of the bonding property of the final adhesive tape to place a so-called modified polypropylene, i.e. a polypropylene incorporated with a small amount of a carboxylic acid or its derivative such as a carboxylic acid anhydride, between the base sheet and the adhesive layer prior to the application of the adhesive layer.

The laminated sheet thus obtained is then oriented in a stretching ratio such that the orientation in the longitudinal direction is greater than the orientation in the transverse (i.e. width) direction. Namely, it is necessary that the stretching rate in the longitudinal direction is greater than the stretching rate in the transverse direction. If the stretching rate in the longitudinal direction is not greater than the stretching rate in the transverse direction, the stretchability or elongation of the obtained adhesive tape becomes great thus leading to poor dispenser severability. More specifically, it is preferred that the sheet is biaxially stretched with a transverse stretching rate of at least 6 times and the product of the longitudinal and transverse stretching rates being within a range of at least 42 and less than 72. If the transverse stretching rate is less than 6 times, the uniformity of the stretching tends to be inferior thus leading to an irregularity in the thickness in the transverse direction. On the other hand, if the product of the longitudinal and transverse stretching rates is less than 42, an adequate orientation effect can not be expected from the stretching, and if the product is 72 or greater, it is likely that the sheet ruptures during the stretching operation, such being undesirable for the process of industrial production. The stretching is preferably conducted at an ambient temperature of from 150° to 160° C. Usually, the final adhesive tape after the stretching has the base sheet of from 30 to 40μ and the adhesive layer of from 15 to 25μ.

Further, the stretched adhesive tape of the present invention may be subjected to an electron beam irradiation of about 10 Mrad to further improve the severability of the adhesive tape.

Now, the present invention will be described in further detail with reference to Examples.

EXAMPLE 1

On both sides of an intermediate layer made of a crystalline polypropylene containing a fully hydrogenated alicyclic petroleum resin (ARCON P-125, manufactured by Arakawa Chemical Industries Co., Ltd.) in an amount as shown in Table 1 and 5% weight of an ethylene-butene-1 copolymer and having an isotactic index of 96% and a melt index of 2, layers of the same crystalline polypropylene as above were laminated by a co-extrusion lamination method at an extrusion temperature within a range of from 230° to 250° C. to form a base sheet. In this case, the thickness of the intermediate layer was 1810μ which corresponds to 80% of the total thickness (i.e. 2270μ) of the base sheet. The thickness of the crystalline polypropylene layer laminated on each side of the intermediate layer was 230μ.

Then, on one side of the base sheet thus obtained, an acrylic acid ester adhesive was coated in a thickness of 800μ, and the sheet was stretched at a stretching temperature within a range of from 150° to 160° C. in a longitudinal stretching rate of 9 times and in a transverse stretching rate of 7 times. Then, the stretched sheet was subjected to heat treatment at 170° C. for 6 seconds, whereupon an adhesive tape having a base sheet thickness of 36μ and an adhesive layer thickness of 20μ was obtained. The quality and properties of each adhesive tape thus prepared are shown in Table 1.

The finger-tearability was determined in such a manner that the adhesive tape thus obtained and having a width of 18 mm was pinched by fingers of both hands and tried to be torn in the transverse direction. This tearing trial was repeated 20 times, and the success rate was represented by percentage (%).

The dispenser severability was determined with use of the tape having the same width as in the case of the determination of the finger-tearability in such a manner that the cutting trial was repeated 20 times with use of a commercially available dispenser and the success rate was represented by percentage (%).

The tensile strength and elongation were measured in the longitudinal direction of the tapes with respect to the adhesive tapes having a width of 18 mm in accordance with JIS Z-1522.

The modulus of elasticity was measured in the longitudinal direction of the tapes in accordance with ASTM D-882.

TABLE 1

| Sample No. | Petroleum resin content in the intermediate layer (%) | Finger tearability (%) | Dispenser severability (%) | Tensile strength (Kg/18 mm width) | Elongation (%) | Modulus of elasticity (Kg/mm$^2$) |
|---|---|---|---|---|---|---|
| 1 | 0 | 50 | 100 | 9.4 | 25 | 250 |
| 2 | 15 | 80 | 100 | 8.2 | 25 | 300 |
| 3 | 25 | 100 | 100 | 7.5 | 25 | 350 |
| 4 | 35 | 100 | 100 | 7.2 | 28 | 360 |
| 5 | 45 | 100 | 80 | 5.2 | 35 | 370 |

It is seen from Table 1 that Samples 3 and 4 which fall within the scope of the present invention, are superior in both the finger-tearability and the dispenser severability and have a high modulus of elasticity i.e. superior stiffness. Thus, they are easy to use as adhesive tapes.

Whereas, Samples 1 and 2 in which the petroleum resin content in the intermediate layer was less than 25%, have a great tensile strength and thus they are inferior in the finger tearability. On the other hand, Sample 5 in which the petroleum resin content exceeded 35%, is inferior in the dispenser severability and it is likely to lead to a shrinkage trouble during the storage of the wound-up tape since it has a small tensile strength.

EXAMPLE 2

On both sides of an intermediate layer made of the crystalline polypropylene containing 25% by weight of the same petroleum resin as used in Example 1 and 5% by weight of the ethylene-butene-1 copolymer and having an isotactic index of 96% and a melt index of 2, layers of the same crystalline polypropylene as above were laminated in the same thickness by a co-extrusion lamination method at a temperature within a range of from 230° to 250° C. In this case, the thickness of the intermediate layer had various ratios relative to the total thickness (2270μ) of the base sheet, as shown in Table 2. After coating on one side of each base sheet an acrylic acid ester adhesive in a thickness of 1260μ, the sheet was subjected to the stretching and heat treatment under the same conditions as in Example 1, whereupon an adhesive tape having a base sheet thickness of 36μ and an adhesive layer thickness of 20μ was obtained. The quality and properties of each adhesive tape thus obtained are shown in Table 2. The various measurements were conducted by the same methods as described in Example 1.

TABLE 2

| Sample No. | Thickness ratio of the intermediate layer (%) | Finger tearability (%) | Dispenser severability (%) | Tensile strength (Kg/18 mm width) | Elongation (%) | Modulus of elasticity (Kg/mm$^2$) |
|---|---|---|---|---|---|---|
| 1 | 94 | 100 | 80 | 7.0 | 45 | 350 |
| 2 | 90 | 100 | 95 | 7.3 | 30 | 350 |
| 3 | 80 | 100 | 100 | 7.5 | 25 | 350 |
| 4 | 60 | 90 | 100 | 8.0 | 25 | 350 |
| 5 | 55 | 60 | 100 | 9.0 | 25 | 350 |

It is seen from Table 2 that Samples 2 to 4 which fall within the scope of the present invention, are superior in both the finger-tearability and the dispenser severability, and have a high modulus of elasticity, and thus they are easy to use as adhesive tapes.

Whereas, Sample 1 in which the thickness ratio of the intermediate layer exceeded 90%, has a great elongation and thus is inferior to the dispenser severability. On the other hand, Sample 5 in which the thickness ratio of the intermediate layer is less than 60%, is extremely poor in its finger-tearability.

EXAMPLE 3

Base sheets were prepared in the same combination of the materials as in Example 2. In this case, the thickness of the intermediate layer was 80% of the total thickness of each base sheet. After coating an acrylic acid ester adhesive on one side of each base sheet, the sheet was stretched at a stretching temperature within a range of from 150° to 160° C. in the longitudinal and transverse stretching rates as shown in Table 3, and then subjected to heat treatment at a temperature of 170° C. for 6 seconds, whereupon an adhesive tape having a base sheet thickness of 36μ and an adhesive layer thickness of 20μ was obtained. The quality and properties of each adhesive tape thus obtained are shown in Table 3. The various measurements were conducted by the methods described in Example 1.

TABLE 3

| Sample No. | Stretching rates longitudinal direction × Transverse direction | Finger tearability (%) | Dispenser severability (%) | Tensile strength (Kg/18 mm width) | Elongation (%) | Modulus of elasticity (Kg/mm$^2$) |
|---|---|---|---|---|---|---|
| 1 | 6 × 7 | 100 | 80 | 7.5 | 40 | 320 |
| 2 | 7 × 6 | 100 | 90 | 7.5 | 30 | 350 |
| 3 | 9 × 7 | 100 | 100 | 7.5 | 25 | 350 |
| 4 | 12 × 6 | Films were susceptible to rupture and it was impossible to obtain test samples. | | | | |

It is seen from Table 3 that Samples 2 and 3 which fall within the scope of the present invention, are superior in both the finger-tearability and the dispenser severability, and have a high modulus of elasticity, and thus they are easy to use as adhesive tapes.

Whereas, Sample 1 in which the longitudinal stretching rate was smaller than the transverse stretching rate, has good finger-tearability but has a great elongation and thus is inferior in the dispenser severability. On the other hand, Sample 4 in which the longitudinal stretching rate was greater than the transverse stretching rate but the product of the longitudinal and transverse stretching rates was not less than 72, was susceptible to rupture during the stretching operation, and it was impossible to obtain test samples.

I claim:

1. An adhesive tape which comprises a base sheet and an adhesive layer coated on one side of the base sheet, characterized in that said base sheet comprises an intermediate layer made of a crystalline polypropylene containing from 25 to 35% by weight of a petroleum resin and outer layers made of a crystalline polypropylene laminated on both sides of the intermediate layer, said intermediate layer having a thickness within a range of from 60 to 90% of the total thickness of the base sheet and the layers of the base sheet being biaxially oriented so that the orientation in the longitudinal direction is greater than the orientation in the transverse direction.

2. The adhesive tape according to claim 1 wherein the crystalline polypropylene in the intermediate layer and outer layers of the base sheet is an isotactic polypropylene having an isotactic index of from 90 to 97% and a melt index of from 0.5 to 4.0.

3. The adhesive tape according to claim 1 wherein the petroleum resin is selected from the group consisting of an aliphatic petroleum resin, an alicyclic petroleum resin and an aromatic petroleum resin.

4. The adhesive tape according to claim 1 wherein the petroleum resin is a fully hydrogenated alicyclic petroleum resin.

5. The adhesive tape according to claim 1 wherein the ratio of the thickness of the crystalline polypropylene layer laminated on one side of the intermediate layer to the thickness of the crystalline polypropylene layer laminated on the other side of the intermediate layer, is within a range of from 1.5:1 to 1:1.5.

6. The adhesive tape according to claim 1 wherein the base sheet has a thickness of from 30 to 40μ and the adhesive layer has a thickness of from 15 to 25μ.

7. The adhesive tape according to claim 1 which is subjected to an electron beam irradiation of about 10 Mrad after the biaxial orientation.

8. The adhesive tape according to claim 1 wherein the intermediate layer contains a small amount of an ethylene-α-olefin copolymer.

9. The adhesive tape according to claim 8 wherein the ethylene-α-olefin copolymer is an ethylene-propylene copolymer or an ethylene-butene-1 copolymer.

10. The adhesive tape according to claim 1 wherein the adhesive layer is made of an acrylic acid ester adhesive.

11. The adhesive tape according to claim 10 wherein a polypropylene modified with a small amount of a carboxylic acid or its derivative, is provided between the base sheet and the adhesive layer.

12. The adhesive tape according to claim 1 wherein the layers of the base sheet are biaxialy stretched for orientation with a transverse stretching rate of at least 6 times and the product of the longitudinal and transverse stretching rate being within a range of at least 42 and less than 72.

13. The adhesive tape according to claim 12 wherein the stretching orientation is conducted at a temperature of from 150° to 160° C.

* * * * *